US012662157B2

(12) United States Patent
Jafari et al.

(10) Patent No.: US 12,662,157 B2
(45) Date of Patent: Jun. 23, 2026

(54) VOICE CONTROLLED AUTONOMOUS DRIVING SYSTEM

(71) Applicant: GM Global Technology Operations LLC, Detroit, MI (US)

(72) Inventors: Rouhollah Sayed Jafari, Troy, MI (US); Alireza Esna Ashari Esfahani, San Bruno, CA (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 376 days.

(21) Appl. No.: 18/467,917

(22) Filed: Sep. 15, 2023

(65) Prior Publication Data

US 2025/0091603 A1      Mar. 20, 2025

(51) Int. Cl.
*B60W 60/00* (2020.01)
*G10L 15/16* (2006.01)
*G10L 15/22* (2006.01)

(52) U.S. Cl.
CPC ........... *B60W 60/001* (2020.02); *G10L 15/16* (2013.01); *G10L 15/22* (2013.01); *B60W 2540/21* (2020.02); *G10L 2015/223* (2013.01)

(58) Field of Classification Search
None
See application file for complete search history.

(56) References Cited

U.S. PATENT DOCUMENTS

| | | | |
|---|---|---|---|
| 9,821,763 B2 | 11/2017 | Yuan | |
| 12,227,202 B2 | 2/2025 | Akash et al. | |

| | | | | |
|---|---|---|---|---|
| 12,344,277 B2 | * | 7/2025 | Esna Ashari Esfahani | ................. B60W 50/08 |
| 2014/0214904 A1 | * | 7/2014 | Ims | ........................ G06F 16/252 707/805 |
| 2014/0365228 A1 | * | 12/2014 | Ng-Thow-Hing | ...... G06F 3/017 704/275 |
| 2016/0027436 A1 | * | 1/2016 | Lee | ........................ G10L 15/22 704/236 |
| 2017/0305434 A1 | | 10/2017 | Ratnasingam | |
| 2019/0179304 A1 | * | 6/2019 | Iagnemma | ........... G05D 1/0088 |
| 2019/0337521 A1 | | 11/2019 | Stauber | |

(Continued)

FOREIGN PATENT DOCUMENTS

| | | | | | |
|---|---|---|---|---|---|
| EP | | 3920083 A1 | * | 12/2021 | ........... G06V 10/803 |

*Primary Examiner* — Jennifer M Anda
(74) *Attorney, Agent, or Firm* — Vivacqua Crane, PLLC

(57) ABSTRACT

A voice controlled autonomous driving system for determining a trajectory of a vehicle based on a voice command includes one or more controllers executing instructions to receive an electrical signal representative of the voice command, where the voice command indicates a driving maneuver. The controllers convert the electrical signal into a text-based command, classify the text-based command into one of a plurality of pre-compiled driving maneuvers based on one or more machine learning algorithms, and classify the pre-compiled driving maneuver as either a route-based maneuver or a behavior-based maneuver, and in response to determining the precompiled driving maneuver is a route-based driving maneuver, identify one or more relevant lane segments of the map data affected by the pre-compiled driving maneuver and determine an updated route plan by updating a current route plan the vehicle is presently following to include the one or more relevant lane segments.

20 Claims, 3 Drawing Sheets

(56) References Cited

U.S. PATENT DOCUMENTS

| 2020/0086881 A1 | 3/2020 | Abendroth et al. | |
| 2020/0126544 A1* | 4/2020 | Scaria | G06N 3/08 |
| 2020/0216086 A1* | 7/2020 | Lenke | B60W 50/08 |
| 2021/0070316 A1* | 3/2021 | Hrabak | B60W 60/001 |
| 2021/0105619 A1 | 4/2021 | Kashani et al. | |
| 2021/0382560 A1* | 12/2021 | Barth | G06F 3/017 |
| 2023/0041105 A1* | 2/2023 | Santucci | B60K 35/80 |
| 2023/0095988 A1 | 3/2023 | Bhattacharya et al. | |
| 2023/0143683 A1 | 5/2023 | Suh et al. | |

* cited by examiner

VOICE CONTROLLED AUTONOMOUS DRIVING SYSTEM

INTRODUCTION

The present disclosure relates to a voice controlled autonomous driving system that determines the trajectory of a vehicle based on a voice command generated by an occupant of the vehicle.

Voice commands may be used to operate various features and systems that are part of a vehicle. For example, an occupant of a vehicle may instruct an audio system of a vehicle to play a specific song or other type of audio file in response to receiving a voice command. As another example, the occupant may make telephone calls within the vehicle without manually accessing his or her smartphone based on voice commands. The occupant may also utilize voice commands to provide a destination address to a navigation system of a vehicle. Accordingly, it is to be appreciated that voice commands provide occupants with hands-free access to various functions and systems within a vehicle. However, there is an ongoing need to extend voice commands to other features and systems that are part of the vehicle to enhance an occupant's overall driving experience and to improve customer satisfaction.

Thus, while current vehicle systems achieve their intended purpose, there is a need in the art for an improved approach to provide voice activated features for various vehicle systems.

SUMMARY

According to several aspects, a voice controlled autonomous driving system for determining a trajectory of a vehicle based on a voice command is disclosed. The voice controlled autonomous driving system includes one or more controllers executing instructions to receive an electrical signal representative of the voice command generated by an occupant of the vehicle, where the voice command indicates a driving maneuver that alters motion of the vehicle. The one or more controllers convert the electrical signal into a text-based command based on one or more speech recognition algorithms. The one or more controllers classify the text-based command into one of a plurality of pre-compiled driving maneuvers based on one or more machine learning algorithms, where the pre-compiled driving maneuvers represent potential driving maneuvers that the vehicle has the potential to execute. The one or more controllers classify the pre-compiled driving maneuver as either a route-based driving maneuver or a behavior-based driving maneuver. In response to classifying the pre-compiled driving maneuver as the route-based driving maneuver, the one or more controllers compare the pre-compiled driving maneuver with map data to identify one or more relevant lane segments of the map data affected by the pre-compiled driving maneuver. The one or more controllers determine an updated route plan by updating a current route plan the vehicle is presently following to include the one or more relevant lane segments, where the trajectory of the vehicle is determined based on the updated route plan.

In another aspect, in response to classifying the pre-compiled driving maneuver as a behavior-based driving maneuver, the one or more controllers compare the pre-compiled driving maneuver with a plurality of behavior planner parameters to determine one or more updated behavior planner parameters.

In yet another aspect, the one or more controllers execute instructions to determine an updated goal state of the vehicle based on the one or more updated behavior planner parameters.

In an aspect, the updated goal state indicates a driving maneuver, the one or more updated behavior planner parameters, and the behavior planner parameters that are followed to execute the pre-compiled driving maneuver and the trajectory of the vehicle is determined based on the updated goal state.

In another aspect, a confidence score indicating a confidence of an algorithm that classifies the text-based command is associated with the pre-compiled driving maneuver.

In yet another aspect, the voice controlled autonomous driving system comprising a human-machine interface (HMI) in electronic communication with the one or more controllers.

In an aspect, the one or more controllers execute instructions to compare the confidence score associated with the pre-compiled driving maneuver with a confidence threshold value, and in response to determining the confidence score associated with the pre-compiled driving maneuver is less than the confidence threshold value, the one or more controllers instruct the HMI to generate a message indicating the voice controlled autonomous driving system is unable to execute the voice command.

In another aspect, in response to determining the confidence score associated with the pre-compiled driving maneuver is greater than or equal to the confidence threshold value, the one or more controllers compare the pre-compiled driving maneuver with a set of traffic rules associated with the specific location of the vehicle. In response to determining the pre-compiled driving maneuver is authorized based on the set of traffic rules, the one or more controllers compare the pre-compiled driving maneuver with a plurality of potential active voice commands stored in memory to determine the presence of a conflict between the pre-compiled driving maneuver and the one or the potential active voice commands.

In yet another aspect, in response to determining the pre-compiled driving maneuver conflicts with one of the potential active voice commands, the one or more controllers instruct the HMI to generate a message asking the occupant to select either the pre-compiled driving maneuver or the active voice command that conflicts with the pre-compiled driving maneuver.

In an aspect, in response to determining an absence of a conflict between the pre-compiled driving maneuver and one of the potential active voice commands, classify the pre-compiled driving maneuver as either the route-based driving maneuver or the behavior-based driving maneuver.

In another aspect, the voice controlled autonomous driving system further comprises a microphone in electronic communication with the one or more controllers, where the microphone converts the voice command into the electrical signal representative of the voice command.

In yet another aspect, the route-based driving maneuver represents a maneuver that alters a current route plan the vehicle is following.

In an aspect, the behavior-based driving maneuver represents a maneuver that governs the behavior of the vehicle but does not alter a current route plan the vehicle is presently following.

In another aspect, a method for determining a trajectory of a vehicle based on a voice command by a voice controlled autonomous driving system is disclosed. The method includes receiving, by one or more controllers, an electrical signal representative of the voice command generated by an occupant of the vehicle, where the voice command indicates a driving maneuver that alters motion of the vehicle. The method also includes converting, by the one or more controllers, the electrical signal into a text-based command based on one or more speech recognition algorithms. The method further includes classifying, by the one or more controllers, the text-based command into one of a plurality of pre-compiled driving maneuvers based on one or more machine learning algorithms, where the pre-compiled driving maneuvers represent potential driving maneuvers that the vehicle has the potential to execute. The method also includes classifying the pre-compiled driving maneuver as either a route-based driving maneuver or a behavior-based driving maneuver. In response to classifying the pre-compiled driving maneuver as the route-based driving maneuver, the method includes comparing the pre-compiled driving maneuver with map data to identify one or more relevant lane segments of the map data affected by the pre-compiled driving maneuver. Finally, the method includes determining an updated route plan by updating a current route plan the vehicle is presently following to include the one or more relevant lane segments, where the trajectory of the vehicle is determined based on the updated route plan.

In an aspect, a voice controlled autonomous driving system for determining a trajectory of a vehicle based on a voice command is disclosed. The voice controlled autonomous driving system includes one or more controllers executing instructions to receive an electrical signal representative of the voice command generated by an occupant of the vehicle, where the voice command indicates a driving maneuver that alters motion of the vehicle. The one or more controllers convert the electrical signal into a text-based command based on one or more speech recognition algorithms. The one or more controllers classify the text-based command into one of a plurality of pre-compiled driving maneuvers based on one or more machine learning algorithms, where the pre-compiled driving maneuvers represent potential driving maneuvers that the vehicle has the potential to execute. The one or more controllers classify the pre-compiled driving maneuver as either a route-based driving maneuver or a behavior-based driving maneuver. In response to classifying the pre-compiled driving maneuver as the route-based driving maneuver, the one or more controllers compare the pre-compiled driving maneuver with map data to identify one or more relevant lane segments of the map data affected by the pre-compiled driving maneuver. The one or more controllers determine an updated route plan by updating a current route plan the vehicle is presently following to include the one or more relevant lane segments, where the trajectory of the vehicle is determined based on the updated route plan. In response to classifying the pre-compiled driving maneuver as a behavior-based driving maneuver, the one or more controllers compare the pre-compiled driving maneuver with a plurality of behavior planner parameters to determine one or more updated behavior planner parameters. The one or more controllers determine an updated goal state of the vehicle based on the one or more updated behavior planner parameters.

In another aspect, the updated goal state indicates a driving maneuver, the one or more updated behavior planner parameters, and the behavior planner parameters that are followed to execute the pre-compiled driving maneuver and the trajectory of the vehicle is determined based on the updated goal state.

In yet another aspect, a confidence score indicating a confidence of an algorithm that classifies the text-based command is associated with the pre-compiled driving maneuver.

In an aspect, the voice controlled autonomous driving system further comprises a HMI in electronic communication with the one or more controllers.

In another aspect, the one or more controllers compare the confidence score associated with the pre-compiled driving maneuver with a confidence threshold value and in response to determining the confidence score associated with the pre-compiled driving maneuver is less than the confidence threshold value, instruct the HMI to generate a message indicating the voice controlled autonomous driving system is unable to execute the voice command.

In another aspect, the voice controlled autonomous driving system further comprises a microphone in electronic communication with the one or more controllers, where the microphone converts the voice command into the electrical signal representative of the voice command.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
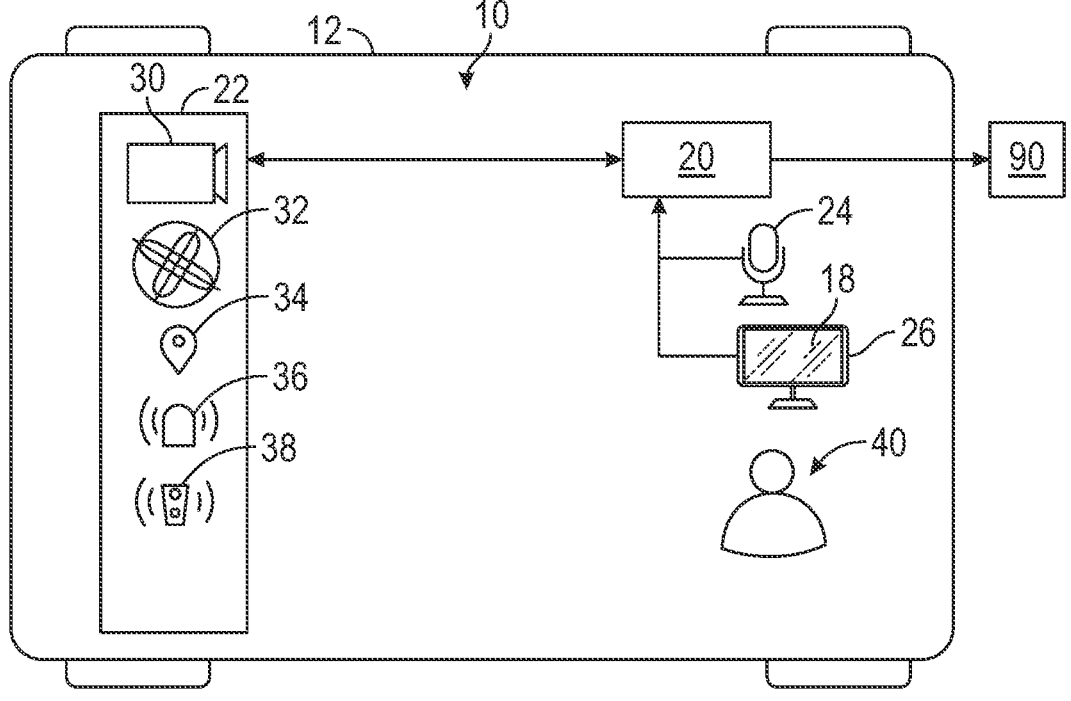
FIG. 1 is a schematic diagram of a vehicle including the disclosed voice controlled autonomous driving system including one or more controllers in electronic communication with a plurality of perception sensors and a microphone, according to an exemplary embodiment.

Referring to FIG. 1, a schematic diagram of an exemplary voice controlled autonomous driving system 10 for a vehicle 12 is illustrated. It is to be appreciated that the vehicle 12 may be any type of vehicle such as, but not limited to, a sedan, truck, sport utility vehicle, van, or motor home. It is to be appreciated that the voice controlled autonomous driving system 10 provides at least Level 2 autonomous driving control such as, for example, an advanced driver-assistance system (ADAS). The voice controlled autonomous driving system 10 includes one or more controllers 20 in electronic communication with a plurality of perception sensors 22, a microphone 24, and a human-machine interface (HMI) 26. The plurality of perception sensors 22 are configured to collect perception data indicative of an environment surrounding the vehicle 12. In the non-limiting embodiment as shown in FIG. 1, the plurality of perception sensors 22 include one or more cameras 30, an inertial measurement unit (IMU) 32, a global positioning system (GPS) 34, radar 36, and LiDAR 38, however, is to be appreciated that additional sensors may be used as well. The HMI 26 represents a user interface, where an occupant 40 of the vehicle 12 receives message from and provides user input to the voice controlled autonomous driving system 10 by the HMI 26. One example of the HMI 26 is a touchscreen that receives user input and shows images on a display 18 to the occupant 40.

Figure 2:
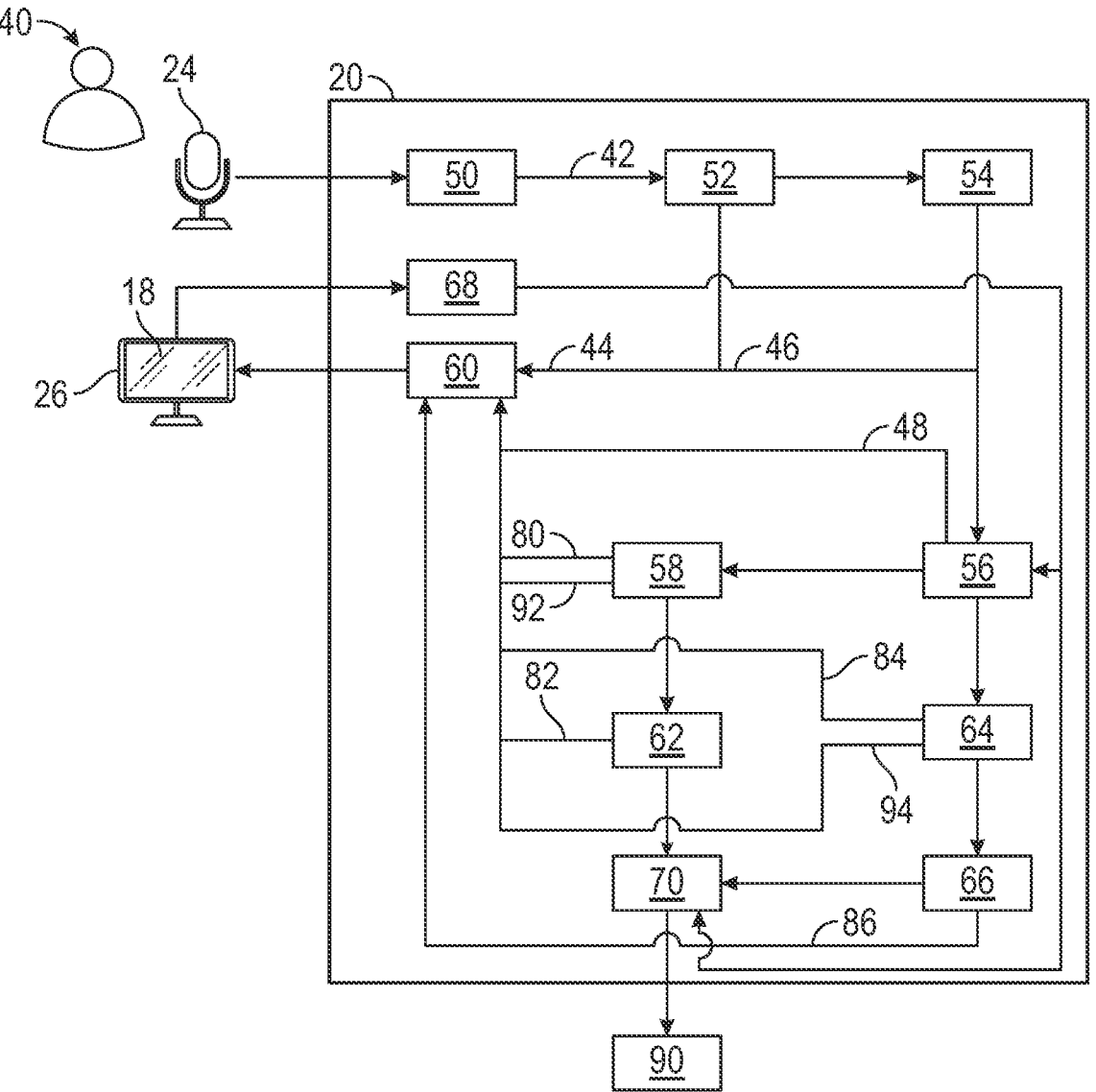
FIG. 2 is an illustration of the software architecture of the one or more controllers shown in FIG. 1, according to an exemplary embodiment.

The microphone 24 represents a device that converts sound waves into electrical signals, where the electrical signals are received by the one or more controllers 20. Specifically, the microphone 24 converts a voice command generated by the occupant 40 of the vehicle 12 into an electrical signal representative of the voice command. As explained below, the one or more controllers 20 transform the electrical signal representative of the voice command into a text-based command 42 (FIG. 2). The one or more controllers 20 determine a trajectory 90 of the vehicle 12 based on the text-based command 42, where the trajectory 90 prescribes movement of the vehicle 12 within a predefined time horizon. The voice command generated by the occupant 40 indicates a driving maneuver that alters motion of the vehicle 12 as the vehicle 12 is traveling. In other words, the voice command generated by the occupant 40 indicates a driving maneuver that changes the current trajectory of the vehicle 12. It is also to be appreciated that the occupant 40 is an authorized operator of the vehicle 12. The occupant 40 may be authorized by any type of a command to take the next exit along a highway, to make a lane change, to pass another vehicle, and to change the destination location of a route plan.

FIG. 2 illustrates the software architecture of the one or more controllers shown in FIG. 1. The one or more controllers 20 include a voice recognition module 50, a command classification module 52, a regulation validation module 54, a memory module 56, a map association module 58, a feedback message generation module 60, a route planning module 62, a planner adaptation module 64, a behavior planner module 66, a user update routing module 68, and a motion control module 70. Referring to FIGS. 1 and 2, the voice recognition module 50 of the one or more controllers 20 is in electronic communication with the microphone 24. The voice recognition module 50 receives the electrical signal representative of the voice command generated by the occupant 40 from the microphone 24 and converts the electrical signal into the text-based command 42 based on one or more speech recognition algorithms. Some examples of speech recognition algorithms for converting the electrical signals into the text-based command 42 include, but are not limited to, for example, the perceptual linear prediction (PLP) features, Viterbi search, deep neural networks, and discrimination training. The text-based command 42 is then received by the command classification module 52.

The text-based command 42 is classified into a pre-compiled driving maneuver that is part of a plurality of pre-compiled driving maneuvers by the command classification module 52 of the one or more controllers 20. The pre-compiled driving maneuvers represent a list of potential driving maneuvers that the vehicle 12 has the potential to execute. Some examples of the potential driving maneuvers include, but are not limited to, a command to take the next exit, to make a lane change (either a left-hand lane change or a right-hand lane change), and to pass another vehicle (either by the left lane or the right lane). For example, if the occupant 40 created a voice command instructing the vehicle 12 to fly over traffic, this is not a driving maneuver that the vehicle 12 has the potential to execute, and therefore would not be included in the list of pre-compiled driving maneuvers.

The command classification module 52 classifies the text-based command 42 into one of the plurality of pre-compiled driving maneuvers based on one or more machine learning algorithms. In an embodiment, the command classification module 52 classifies the text-based command 42 based on a neural network trained to classify the text-based command 42. The command classification module 52 also assigns a confidence score that is associated with the pre-compiled driving maneuver, where the confidence score indicates the confidence of an algorithm that classifies the text-based command 42. The confidence score is expressed as a probability ranging in value from zero to one.

The command classification module 52 compares the confidence score associated with the pre-compiled driving maneuver with a confidence threshold value. In an embodiment, the confidence threshold value is 0.6, however, it is to be appreciated that the confidence threshold value is based on a level of accuracy targeted by the voice controlled autonomous driving system 10. For example, in another embodiment with enhanced accuracy, the confidence threshold value is 0.9. In response to determining the confidence score associated with the pre-compiled driving maneuver is less than the confidence threshold value, the command classification module 52 transmits an error message 44 to the feedback message generation module 60 indicating the text-based command 42 is unable to be accurately classified into one of the pre-compiled driving maneuvers. The feedback message generation module 60 then instructs the HMI 26 to generate a message communicated to the occupant 40 indicating the voice command is not actionable.

In response to determining the confidence score associated with the pre-compiled driving maneuver is greater than or equal to the confidence threshold value, the command classification module 52 transmits the pre-compiled driving maneuver to the regulation validation module 54. The regulation validation module 54 stores a set of traffic rules associated with a specific location where the vehicle 12 is currently located. The set of traffic rules indicate regulatory rules such as, for example, a speed limit associated with the road the vehicle 12 is presently traveling along, and if passing within a current lane of travel is permitted. The regulation validation module 54 compares the pre-compiled driving maneuver with the traffic rules associated with the specific location of the vehicle 12. In response to determining the pre-compiled driving maneuver is not authorized based on the traffic rules associated with the specific location where the vehicle 12 is located, the regulation validation module 54 generates a message 46 indicating the pre-compiled driving maneuver is not authorized, where the message 46 is received by the to the feedback message generation module 60. The feedback message generation module 60 then instructs the HMI 26 to generate a message to the occupant 40 indicating the voice command is not authorized. For example, if the pre-compiled driving maneuver is to increase speed and the vehicle 12 is already traveling at the speed limit, the feedback message generation module 60 instructs the display 18 of the HMI 26 to read "already at speed limit".

In response to determining the pre-compiled driving maneuver is authorized based on the set of traffic rules, the regulation validation module 54 transmits the pre-compiled driving maneuver to the memory module 56. The memory module 56 compares the pre-compiled driving maneuver with a plurality of potential active voice commands stored in memory of the one or more controllers 20 to determine if the precompiled driving maneuver conflicts with one of the potential active voice commands. The potential active voice commands are saved in memory of the one or more controllers 20 and represent previously generated pre-compiled driving maneuvers that are presently being executed by the voice controlled autonomous driving system 10. For example, if the pre-compiled driving maneuver is to pass a surrounding vehicle, while one of the potential active voice commands instruct the vehicle 12 to stay in the current lane, the memory module 56 determines a conflict exists. In addition to the previously generated pre-compiled driving commands, the potential active voice commands also include redundant driving maneuvers that have already been generated by the occupant 40 as well.

In response to determining the pre-compiled driving maneuver conflicts with one of the potential active voice commands, the memory module 56 transmits a message 48 to the feedback message generation module 60. The feedback message generation module 60 instructs the HMI 26 to generate a message asking the occupant 40 to select either the pre-compiled driving maneuver or the active voice command that conflicts with the pre-compiled driving maneuver. The HMI 26 receives the user input from the occupant 40 indicating either the pre-compiled driving maneuver or the active voice command. The user update routing module 68 receives the user input from the HMI 26 and transmits the user input to the memory module 56. The memory module 56 then replaces the conflicting pre-compiled driving maneuver and the active voice command with the response provided by the occupant 40.

In response to determining the pre-compiled driving maneuver does not conflict with one of the potential active voice commands, the memory module 56 classifies the pre-compiled driving maneuver as either a route-based driving maneuver or a behavior-based driving maneuver. The route-based driving maneuver represents a maneuver that alters a current route plan the vehicle 12 is presently following. For example, taking the next exit along a highway or changing the destination location are route-based maneuvers. The behavior-based driving maneuver represents a maneuver that governs a behavior of the vehicle 12 but does not alter the current route plan the vehicle 12 is presently following. Some examples of behavior-based driving maneuvers include changing from a current lane of travel to an adjacent lane and making a stop along the current route plan. For example, the pre-compiled driving maneuver may be a lane change to pass a slower vehicle.

In response to classifying the pre-compiled driving maneuver as a route-based driving maneuver, the memory module 56 transmits the pre-compiled driving maneuver to the map association module 58. The map association module 58 stores map data indicative representative of a current location of the vehicle 12. The map data includes lane-level data that includes information related to static scene elements located in the environment surrounding the vehicle 12 such as, for example, lane marking location and type, traffic sign type, number of lanes, and lane maneuver types. The map association module 58 compares the pre-compiled driving maneuver with the map data to identify one or more relevant lane segments of the map data affected by the pre-compiled driving maneuver. For example, if the pre-compiled driving maneuver is a left turn, then the lane segments associated with the left turn maneuver are the one or more relevant lane segments. The map association module 58 transmits the one or more relevant lane segments to the route planning module 62, where the route planning module 62 determines an updated route plan as explained below.

In an embodiment, the map association module 58 is unable to identify one or more relevant lane segments. For example, the occupant 40 may ask to travel along a roadway that does not exist in real life. In the event the map association module 58 is unable to identify one or more relevant lane segments, the map association module 58 transmits a message 80 indicating no relevant lane segments were identified to the feedback message generation module 60. The feedback message generation module 60 then instructs the HMI 26 to generate a message to the occupant 40 indicating the voice controlled autonomous driving system 10 is unable to identify a route for the vehicle 12 to follow.

In one embodiment, in the event the map association module 58 is unable to identify one or more relevant lane segments, the map association module 58 checks a recommendation system (not illustrated) for an alternative route that is used in place of the updated route plan. If an alternative route is identified, then the map association module 58 transmits a message 92 to the feedback message generation module 60. The feedback message generation module 60 then instructs the HMI 26 to generate a message to the occupant 40 asking the occupant 40 to confirm the alternative route. The user update routing module 68 receives the user input from the HMI 26 and transmits the user input to the memory module 56.

In response to receiving user feedback accepting the alternative route, the HMI 26 transmits the user input to the user update routing module 68. The user update routing module 68 then transmits the alternative route to the memory module 56. The memory module 56 compares the alternative route with the plurality of potential active voice commands stored in the memory of the one or more controllers 20 to determine if the alternative route conflicts with one of the potential active voice commands. The alternative route represents a route that has the potential to be used in place of the original pre-compiled driving maneuver. For example, if the pre-compiled driving maneuver is taking the next exit on the right but no exit on the right exists, the alternative route may be the next exit to the left instead.

Determining the updated route plan shall now be described. The route planning module 62 determines the updated route plan by updating the current route plan the vehicle 12 is presently following to include the one or more relevant lane segments. In an embodiment, if the occupant 40 has indicated the voice command is urgent, then the route planning module 62 transmits the updated route plan directly to the motion control module 70. The motion control module 70 determines the trajectory 90 of the vehicle 12 based on the updated route plan. In the event the occupant 40 has indicated the voice command is not urgent, then the route planning module 62 transmits a message 82 to the feedback message generation module 60 indicating the voice command is not urgent. The feedback message generation module 60 instructs the HMI 26 to generate a message asking the occupant to first confirm the updated route plan. The user update routing module 68 receives the user input from the HMI 26.

In the event the occupant 40 agrees to the updated route plan, the occupant 40 provides user input to the HMI 26 indicating the occupant 40 has confirmed the updated route plan, and the user update routing module 68 receives the indication. The user update routing module 68 then transmits the updated route plan to the motion control module 70. In the event the occupant 40 enters user input to the HMI 26 rejecting the updated route plan, then the user update routing module 68 transmits the message to the memory module 56 to remove the pre-compiled driving maneuver from memory and the voice controlled autonomous driving system 10 terminates the current procedure and the vehicle 12 continues along the current route plan.

In response to classifying the pre-compiled driving maneuver as a behavior-based driving maneuver, the memory module 56 transmits the pre-compiled driving maneuver to the planner adaptation module 64. The planner adaptation module 64 stores a plurality of behavior planner parameters that define the behavior of the vehicle 12 while driving autonomously. Some examples of the behavior planner parameters include, but are not limited to, a rate of acceleration of the vehicle 12 after coming to a stop, a rate of deceleration of the vehicle 12 while approaching a stop, a maximum level of acceleration, a target lane, a target velocity, and a target level of driving aggression. In an embodiment, three levels of driving aggression exist, a conservative level, a moderate level, and an aggressive level of aggression, however, it is to be appreciated that fewer or more levels of driving aggression may be used as well.

In an embodiment, if the planner adaptation module 64 is unable to locate and adapt the behavior planner parameters, the planner adaptation module 64 transmits a message 84 to the feedback message generation module 60 indicating no behavior planner parameters were located. In response to receiving the message 84, the feedback message generation module 60 instructs the HMI 26 to generate a message informing the occupant 40 the pre-compiled driving maneuver is unable to be executed.

In one embodiment, in the event no behavior planner parameters are located, the planner adaptation module 64 may check a recommendation system (not illustrated) for an alternative driving maneuver that is used in place of the pre-compiled driving maneuver. In the event an alternative driving maneuver is identified, the planner adaptation module 64 transmits a message 94 to the feedback message generation module 60 asking the occupant 40 to confirm the alternate driving maneuver. In response to receiving the message 94, the feedback message generation module 60 instructs the HMI 26 to generate a message asking the occupant 40 to confirm the alternative driving maneuver. In response to receiving user input accepting the alternative driving maneuver, the user update routing module 68 transmits the alternative driving maneuver to the memory module 56. The alternative driving maneuver represents a driving maneuver that has the potential to be used in place of the original pre-compiled driving maneuver. For example, if the original pre-compiled driving maneuver was to stop the vehicle 12 on the left-hand side of the road, the alternative voice command is to stop on the right-hand side of the road instead.

Determining an updated goal state of the vehicle 12 shall now be described. The planner adaptation module 64 compares the pre-compiled driving maneuver with the plurality of behavior planner parameters to determine one or more updated behavior planner parameters. The updated behavior planner parameters represent behavior planner parameters that are updated to allow the vehicle 12 to execute the pre-compiled driving maneuver. For example, if the pre-compiled driving maneuver is a right-hand lane change to pass a slower vehicle, then the planner adaptation module 64 would determine the one or more updated behavior planner parameters is the target lane of travel. Specifically, the target lane of travel is changed from the current lane of travel to the right-hand lane of travel.

The planner adaptation module 64 transmits the one or more updated behavior planner parameters to the behavior planner module 66. The behavior planner module 66 determines the updated goal state of the vehicle 12 based on the one or more updated behavior planner parameters. The updated goal state indicates the driving maneuver, the one or more updated behavior planner parameters, and the behavior planner parameters that are followed to execute the pre-compiled driving maneuver. For example, if the pre-compiled driving maneuver is a right-hand lane change to pass a slower vehicle and the one or more updated behavior planner parameters is changing the target lane of travel from the current lane of travel to the right-hand lane of travel, then the updated goal state would include the driving maneuver (changing to the right-hand lane of travel), the target lane of travel, the target level of driving aggression, the target velocity. In an embodiment, if the occupant 40 has indicated the voice command is urgent, then the behavior planner module 66 transmits the updated goal state directly to the motion control module 70. The motion control module 70 determines the trajectory 90 of the vehicle 12 based on the updated goal state. In the event the occupant 40 has not indicated the voice command is urgent, then the behavior planner module 66 transmits a message 86 to the feedback message generation module 60, where the feedback message generation module 60 instructs the HMI 26 to generate a message asking the occupant to first confirm the updated goal state before determining the trajectory 90 of the vehicle 12.

In the event the occupant 40 agrees to the updated goal state, the occupant 40 provides user input to the HMI 26 indicating the occupant 40 has confirmed the updated goal state, and the motion control module 70 receives the indication. The motion control module 70 then determines the trajectory 90 of the vehicle 12 based on the updated goal state. In the event the occupant 40 enters user input to the HMI 26 rejecting the updated goal state, then the behavior planner module 66 transmits the message to the memory module 56 to remove the pre-compiled driving maneuver from memory and the voice controlled autonomous driving system 10 terminates the current procedure and the vehicle 12 continues along the current route plan.

Figure 3:
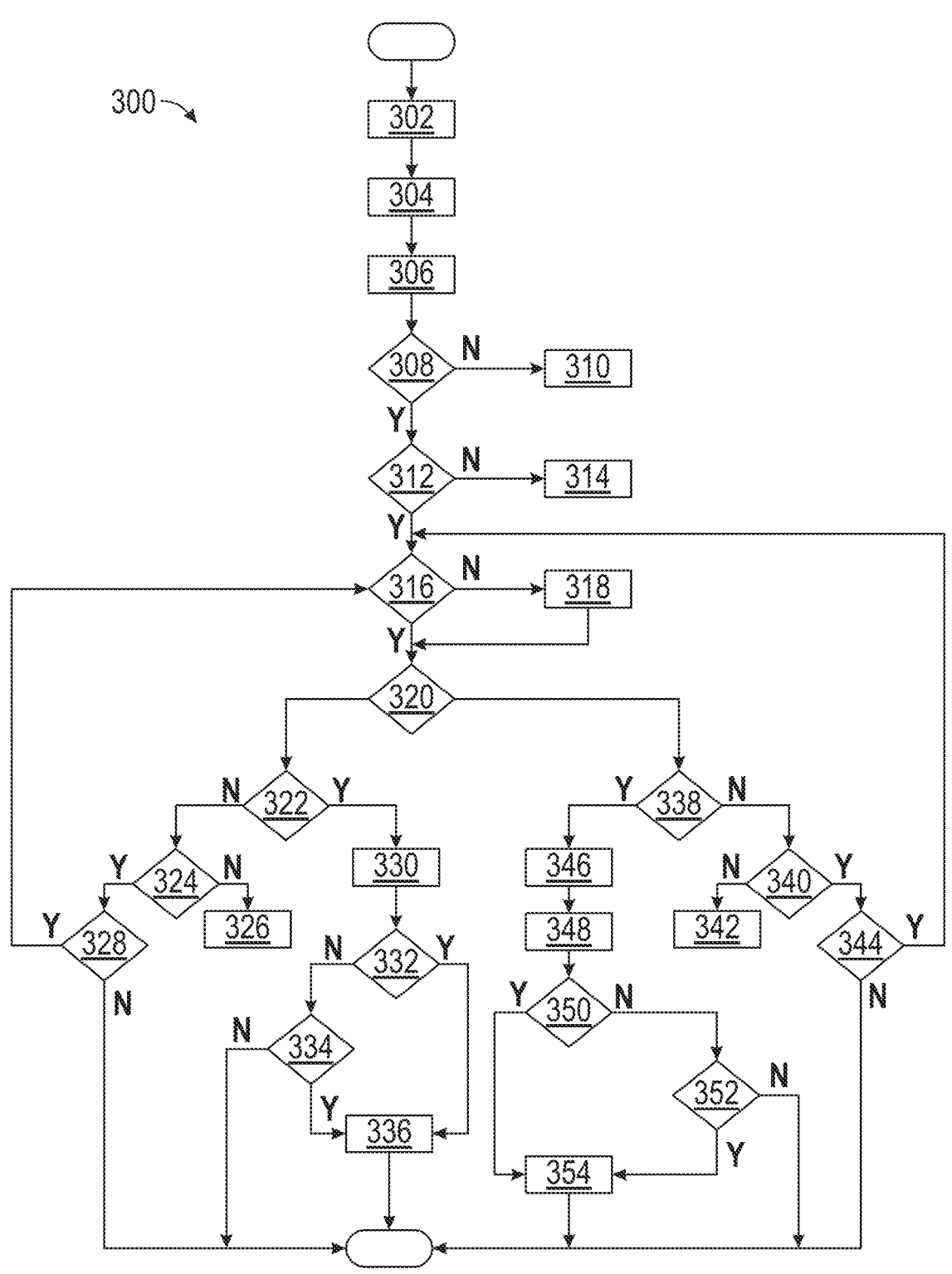
FIG. 3 is a process flow diagram illustrating a method for determining a trajectory of a vehicle based on a voice command generated by an occupant of the vehicle by the disclosed voice controlled autonomous driving system, according to an exemplary embodiment.

FIG. 3 is a process flow diagram illustrating an exemplary method 300 for determining the trajectory 90 of the vehicle 12 based on the voice command generated by the occupant 40 by the disclosed voice controlled autonomous driving system 10. Referring generally to FIGS. 1-3, the method 300 begins at block 302. In block 302, the voice recognition module 50 of the one or more controllers 20 receive the electrical signal from the microphone 24 representative of the voice command generated by the occupant 40 of the vehicle 12, where the voice command indicates a driving maneuver that alters motion of the vehicle 12. The method 300 may then proceed to block 304.

In block 304, the voice recognition module 50 of the one or more controllers 20 converts the electrical signal into the text-based command 42 based on one or more speech recognition algorithms. The method 300 may then proceed to block 306.

In block 306, the command classification module 52 of the one or more controllers 20 classifies the text-based command 42 into one of a plurality of pre-compiled driving maneuvers based on one or more machine learning algorithms. The pre-compiled driving maneuvers represent potential driving maneuvers that the vehicle 12 has the potential to execute. As mentioned above, a confidence score indicating the confidence of an algorithm that classifies the text-based command 42. The method 300 may then proceed to decision block 308.

In decision block 308, the command classification module 52 of the one or more controllers 20 compares the confidence score associated with the pre-compiled driving maneuver with a confidence threshold value. In response to determining the confidence score associated with the pre-compiled driving maneuver is less than the confidence threshold value, the method 300 proceeds to block 310. In block 310, the command classification module 52 transmits the error message 44 to the feedback message generation module 60 indicating the text-based command 42 is unable to be accurately classified into one of the pre-compiled driving maneuvers. The feedback message generation module 60 then instructs the HMI 26 to generate a message communicated to the occupant 40 indicating the voice command is not actionable. The method 300 may then terminate or, in the alternative, return to block 302 where the occupant 40 generates another voice command.

In response to determining the confidence score associated with the pre-compiled driving maneuver is greater than or equal to the confidence threshold value, the method 300 proceeds to decision block 312. In decision block 312, the regulation validation module 54 compares the pre-compiled driving maneuver with the set of traffic rules associated with the specific location of the vehicle 12. In response to determining the pre-compiled driving maneuver is not authorized based on the set of traffic rules associated with the specific location where the vehicle 12 is located, the method 300 proceeds to block 314. In block 314, the feedback message generation module 60 instructs the instructs the HMI 26 to generate a message to the occupant 40 indicating the voice command is not authorized. The method 300 may then terminate.

In response to determining the pre-compiled driving maneuver is authorized based on the traffic rules, the method 300 may then proceed to decision block 316. In decision block 316, the memory module 56 of the one or more controllers 20 compares the pre-compiled driving maneuver with the potential active voice commands stored in memory to determine the presence of a conflict or redundancy between the pre-compiled driving maneuver and the one or the potential active voice commands.

In response to determining the presence of a conflict between the pre-compiled driving maneuver and one of the potential active voice commands, the method 300 may then proceed to block 318. In block 318, the memory module 56 transmits a message 48 to the feedback message generation module 60 indicating a disparity. The feedback message generation module 60 then instructs the HMI 26 to generate a message asking the occupant 40 to select either the pre-compiled driving maneuver or the active voice command that conflicts with the pre-compiled driving maneuver. In the event the pre-compiled driving maneuver is redundant with respect to the potential active voice commands, then the pre-compiled driving maneuver is ignored. The method 300 may then proceed to decision block 320. In response to determining an absence of the conflict between the pre-compiled driving maneuver and one of the potential active voice commands, the method 300 may then proceed to decision block 320.

In decision block 320, the memory module 56 classifies the pre-compiled driving maneuver as either a route-based driving maneuver or a behavior-based driving maneuver. In response to classifying the pre-compiled driving maneuver as a route-based driving maneuver, the method 300 proceeds to decision block 322.

In decision block 322, the map association module 58 of the one or more controllers 20 compares the pre-compiled driving maneuver with map data to identify one or more relevant lane segments of the map data affected by the pre-compiled driving maneuver. In the event the map association module 58 is unable to identify one or more relevant lane segments, the method 300 proceeds to decision block 324.

In decision block 324, the map association module 58 checks a recommendation system (not illustrated) for an alternative route that is used in place of the updated route plan. In the event no alternative route is found, the method 300 proceeds to block 326. In block 326, the HMI 26 generates a message to the occupant 40 indicating the voice controlled autonomous driving system 10 is unable to identify an alternative route for the vehicle 12 to follow. The method 300 may then terminate.

Referring to block 324, in the event an alternative route is found, the method 300 proceeds to decision block 328. In decision block 328, the HMI 26 generates a message asking the occupant 40 to confirm the alternative route. In the event the occupant 40 rejects the alternative route, the method 300 may then terminate. In response to receiving user feedback accepting the alternative route, the user update routing module 68 transmits the alternative route to the memory module 56, and the method returns to block 316.

Referring to block 322, in the event the map association module 58 of the one or more controllers 20 identifies one or more relevant lane segments of the map data affected by the pre-compiled driving maneuver, the method 300 proceeds to block 330. In block 330, the route planning module 62 determines the updated route plan by updating the current route plan the vehicle 12 is presently following to include the one or more relevant lane segments, where the trajectory 90 of the vehicle 12 is determined based on the updated route plan. The method 300 may then proceed to decision block 332.

In decision block 332, if the occupant 40 has not indicated the voice command is urgent, then the method 300 proceeds to decision block 334. In decision block 334, the HMI 26 generates a message asking the occupant 40 to first confirm the updated route plan. In the event the occupant 40 confirms the route plan, the method 300 proceeds to block 336. In the event the occupant 40 rejects the route plan, the method 300 may then terminate.

Referring to decision block 332, if the occupant 40 indicates the voice command is urgent, the method 300 proceeds to block 336. In block 336, the voice controlled autonomous driving system 10 executes the trajectory 90 and the method 300 terminates.

Referring to decision block 320, in response to classifying the pre-compiled driving maneuver as a behavior-based driving maneuver, the method 300 then proceeds to decision block 338. In decision block 338, if the planner adaptation module 64 is unable to locate the behavior planner parameters, the method 300 proceeds to block 340.

In decision block 340, the planner adaptation module 64 checks a recommendation system (not illustrated) for an alternative driving maneuver that is used in place of the pre-compiled driving maneuver. In the event no alternative driving maneuver is found, the method 300 proceeds to block 342. In block 342, the planner adaptation module 64 transmits the message 84 to the the feedback message generation module 60 indicating no behavior planner parameters were located, and the HMI 26 generates a message informing the occupant 40 the pre-compiled driving maneuver is unable to be executed. The method 300 may then terminate.

Referring to block 340, in the event an alternative driving maneuver is identified, the method 300 proceeds to decision block 344. In decision block 344, the HMI 26 generates a message asking the occupant 40 to confirm the alternative driving maneuver. In the event the occupant 40 rejects the alternative driving maneuver, the method 300 may then terminate. In response to receiving user feedback accepting the alternative driving maneuver, the user update routing module 68 transmits the alternative driving maneuver to the memory module 56, and the method returns to block 316.

Referring to decision block 338, if the planner adaptation module 64 locates the behavior planner parameters, the method 300 proceeds to block 346. In block 346, the planner adaptation module 64 compares the pre-compiled driving maneuver with the plurality of behavior planner parameters to determine one or more updated behavior planner parameters, where the updated behavior planner parameters represent behavior planner parameters that are updated to allow the vehicle 12 to execute the pre-compiled driving maneuver. The method 300 may then proceed to block 348.

In block 348, the behavior planner module 66 determines the updated goal state of the vehicle 12 based on the one or more updated behavior planner parameters, where the updated goal state indicates the driving maneuver, the one or more updated behavior planner parameters, and the behavior planner parameters that are followed to execute the pre-compiled driving maneuver, where the trajectory 90 of the vehicle 12 is determined based on the updated goal state. The method 300 may then proceed to decision block 350.

In decision block 350, if the occupant 40 has indicated the voice command is not urgent, then the method 300 proceeds to decision block 352. In decision block 352, the HMI 26 generates a message asking the occupant 40 to first confirm the updated goal state. In the event the occupant 40 confirms the updated goal state, the method 300 proceeds to block 354. In the event the occupant 40 rejects the updated goal state, the method 300 may then terminate.

Referring to decision block 350, if the occupant 40 indicates the voice command is urgent, the method 300 proceeds to block 354. In block 354, the voice controlled autonomous driving system 10 executes the trajectory 90 and the method 300 terminates.

Referring generally to the figures, the disclosed voice controlled autonomous driving system provides various technical effects and benefits. Specifically, the disclosed voice controlled autonomous driving system determines the trajectory of the vehicle based on a voice command generated by an occupant of the vehicle. The voice controlled autonomous system verifies the voice command to determine the driving maneuver indicated by the voice command is authorized based on the current traffic rules and does not conflict with other commands that are currently being executed. It is also to be appreciated that the voice controlled autonomous driving system communicates various system limitations and messages to the occupant of the vehicle over the HMI. Finally, in embodiments the occupant may be afforded an opportunity to confirm or reject driving maneuvers first before the driving maneuvers are executed by the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A voice controlled autonomous driving system for determining a trajectory of a vehicle based on a voice command, the voice controlled autonomous driving system comprising:

one or more controllers executing instructions to:

receive an electrical signal representative of the voice command generated by an occupant of the vehicle, wherein the voice command indicates a driving maneuver that alters motion of the vehicle;

convert the electrical signal into a text-based command based on one or more speech recognition algorithms;

classify the text-based command into one of a plurality of pre-compiled driving maneuvers based on one or more machine learning algorithms, wherein the pre-compiled driving maneuvers represent potential driving maneuvers that the vehicle has the potential to execute, and wherein the pre-compiled driving maneuvers include at least the following: take the next exit, to make a lane change, and to pass another vehicle;

classify the pre-compiled driving maneuver as either a route-based driving maneuver or a behavior-based driving maneuver;

in response to classifying the pre-compiled driving maneuver as the route-based driving maneuver, compare the pre-compiled driving maneuver with map data to identify one or more relevant lane segments of the map data affected by the pre-compiled driving maneuver;

determine an updated route plan by updating a current route plan the vehicle is presently following to include the one or more relevant lane segments, wherein the trajectory of the vehicle is determined based on the updated route plan; and instruct the vehicle to perform at least one of accelerating, braking, and steering to follow the trajectory.

2. The voice controlled autonomous driving system of claim 1, wherein the one or more controllers execute instructions to:

in response to classifying the pre-compiled driving maneuver as a behavior-based driving maneuver, compare the pre-compiled driving maneuver with a plurality of behavior planner parameters to determine one or more updated behavior planner parameters.

3. The voice controlled autonomous driving system of claim 2, wherein the one or more controllers execute instructions to:

determine an updated goal state of the vehicle based on the one or more updated behavior planner parameters.

4. The voice controlled autonomous driving system of claim 3, wherein the updated goal state indicates a driving maneuver, the one or more updated behavior planner parameters, and the behavior planner parameters that are followed to execute the pre-compiled driving maneuver and the trajectory of the vehicle is determined based on the updated goal state.

5. The voice controlled autonomous driving system of claim 1, wherein a confidence score indicating a confidence of the one or more machine learning algorithms that classify the text-based command is associated with the pre-compiled driving maneuver.

6. The voice controlled autonomous driving system of claim 5, further comprising a human-machine interface (HMI) in electronic communication with the one or more controllers.

7. The voice controlled autonomous driving system of claim 6, wherein the one or more controllers execute instructions to:

compare the confidence score associated with the pre-compiled driving maneuver with a confidence threshold value; and in response to determining the confidence score associated with the pre-compiled driving maneuver is less than the confidence threshold value, instruct the HMI to generate a message indicating the voice controlled autonomous driving system is unable to execute the voice command.

8. The voice controlled autonomous driving system of claim 7, wherein the one or more controllers execute instructions to:

in response to determining the confidence score associated with the pre-compiled driving maneuver is greater than or equal to the confidence threshold value, compare the pre-compiled driving maneuver with a set of traffic rules associated with a specific location of the vehicle; and in response to determining the pre-compiled driving maneuver is authorized based on the set of traffic rules, compare the pre-compiled driving maneuver with a plurality of potential active voice commands stored in memory to determine the presence of a conflict between the pre-compiled driving maneuver and the one or the potential active voice commands.

9. The voice controlled autonomous driving system of claim 8, wherein the one or more controllers execute instructions to:

in response to determining the pre-compiled driving maneuver conflicts with one of the potential active voice commands, instruct the HMI to generate a message asking the occupant to select either the pre-compiled driving maneuver or the active voice command that conflicts with the pre-compiled driving maneuver.

10. The voice controlled autonomous driving system of claim 8, wherein the pre-compiled driving maneuver is classified as either the route-based driving maneuver or the behavior-based driving maneuver, in response to determining an absence of the conflict.

11. The voice controlled autonomous driving system of claim 1, further comprising a microphone in electronic communication with the one or more controllers, wherein the microphone converts the voice command into the electrical signal representative of the voice command.

12. The voice controlled autonomous driving system of claim 1, wherein the route-based driving maneuver represents a maneuver that alters a current route plan the vehicle is following.

13. The voice controlled autonomous driving system of claim 1, wherein the behavior-based driving maneuver represents a maneuver that governs a behavior of the vehicle but does not alter a current route plan the vehicle is presently following.

14. A method for determining a trajectory of a vehicle based on a voice command by a voice controlled autonomous driving system, the method comprising:

receiving, by one or more controllers, an electrical signal representative of the voice command generated by an occupant of the vehicle, wherein the voice command indicates a driving maneuver that alters motion of the vehicle;

converting, by the one or more controllers, the electrical signal into a text-based command based on one or more speech recognition algorithms;

classifying, by the one or more controllers, the text-based command into one of a plurality of pre-compiled driving maneuvers based on one or more machine learning algorithms, wherein the pre-compiled driving maneuvers represent potential driving maneuvers that the vehicle has the potential to execute, and wherein the pre-compiled driving maneuvers include at least the following: take the next exit, to make a lane change, and to pass another vehicle;

classifying the pre-compiled driving maneuver as either a route-based driving maneuver or a behavior-based driving maneuver;

in response to classifying the pre-compiled driving maneuver as the route-based driving maneuver, comparing the pre-compiled driving maneuver with map data to identify one or more relevant lane segments of the map data affected by the pre-compiled driving maneuver;

determining an updated route plan by updating a current route plan the vehicle is presently following to include the one or more relevant lane segments, wherein the trajectory of the vehicle is determined based on the updated route plan; and instruct the vehicle to perform at least one of accelerating, braking, and steering to follow the trajectory.

15. A voice controlled autonomous driving system for determining a trajectory of a vehicle based on a voice command, the voice controlled autonomous driving system comprising:

one or more controllers executing instructions to:

receive an electrical signal representative of the voice command generated by an occupant of the vehicle, wherein the voice command indicates a driving maneuver that alters motion of the vehicle;

convert the electrical signal into a text-based command based on one or more speech recognition algorithms;

classify the text-based command into one of a plurality of pre-compiled driving maneuvers based on one or more machine learning algorithms, wherein the pre-compiled driving maneuvers represent potential driving maneuvers that the vehicle has the potential to execute, and wherein the pre-compiled driving maneuvers include at least the following: take the next exit, to make a lane change, and to pass another vehicle;

classify the pre-compiled driving maneuver as either a route-based driving maneuver or a behavior-based driving maneuver;

in response to classifying the pre-compiled driving maneuver as the route-based driving maneuver, compare the pre-compiled driving maneuver with map data to identify one or more relevant lane segments of the map data affected by the pre-compiled driving maneuver;

determine an updated route plan by updating a current route plan the vehicle is presently following to include the one or more relevant lane segments, wherein the trajectory of the vehicle is determined based on the updated route plan;

in response to classifying the pre-compiled driving maneuver as a behavior-based driving maneuver, compare the pre-compiled driving maneuver with a plurality of behavior planner parameters to determine one or more updated behavior planner parameters;

determine an updated goal state of the vehicle based on the one or more updated behavior planner parameters; and instruct the vehicle to perform at least one of accelerating, braking, and steering to follow the trajectory.

16. The voice controlled autonomous driving system of claim 15, wherein the updated goal state indicates a driving maneuver, the one or more updated behavior planner parameters, and the behavior planner parameters that are followed to execute the pre-compiled driving maneuver and the trajectory of the vehicle is determined based on the updated goal state.

17. The voice controlled autonomous driving system of claim 15, wherein a confidence score indicating a confidence of the one or more machine learning algorithms that classify the text-based command is associated with the pre-compiled driving maneuver.

18. The voice controlled autonomous driving system of claim 17, further comprising a human-machine interface (HMI) in electronic communication with the one or more controllers.

19. The voice controlled autonomous driving system of claim 18, wherein the one or more controllers execute instructions to:

compare the confidence score associated with the pre-compiled driving maneuver with a confidence threshold value; and in response to determining the confidence score associated with the pre-compiled driving maneuver is less than the confidence threshold value, instruct the HMI to generate a message indicating the voice controlled autonomous driving system is unable to execute the voice command.

20. The voice controlled autonomous driving system of claim 15, further comprising a microphone in electronic communication with the one or more controllers, wherein the microphone converts the voice command into the electrical signal representative of the voice command.

* * * * *